United States Patent [19]
Yoneda

[11] Patent Number: 5,493,432
[45] Date of Patent: Feb. 20, 1996

[54] OPTICAL COMMUNICATION SYSTEM

[75] Inventor: Kazuhiro Yoneda, Kawasaki, Japan

[73] Assignee: Fujitsu Limited, Kawasaki, Japan

[21] Appl. No.: 281,351

[22] Filed: Jul. 27, 1994

[30] Foreign Application Priority Data

Jan. 11, 1994 [JP] Japan .................................. 6-001254

[51] Int. Cl.$^6$ .................................................. H04B 10/08
[52] U.S. Cl. .............................. 359/110; 359/177; 370/16
[58] Field of Search ..................................... 359/110, 115, 359/143, 152, 161, 174, 177, 179; 370/16; 371/8.2

[56] References Cited

U.S. PATENT DOCUMENTS

| | | | |
|---|---|---|---|
| 4,451,916 | 5/1984 | Casper et al. ........................... | 359/110 |
| 5,069,521 | 12/1991 | Hardwick ................................ | 359/110 |

FOREIGN PATENT DOCUMENTS

| | | | |
|---|---|---|---|
| 3201763 | 9/1983 | Germany ................................ | 359/110 |
| 0229433 | 11/1985 | Japan ..................................... | 359/110 |

*Primary Examiner*—Leo H. Boudreau
*Assistant Examiner*—Kinfe-Michael Negash

[57] ABSTRACT

An optical communication system includes first and second optical terminal apparatuses, first and second optical repeating installations, a working transmission line coupling the first and second optical terminal apparatuses via the first optical repeating installation, and a protection transmission line coupling the first and second optical terminal apparatuses via the second optical repeating installation. Each of the first and second optical terminal apparatuses and the first and second optical repeating installations include a mechanism for transmitting an overhead signal including an identifier to the working transmission line and the protection transmission line by multiplexing the overhead signal with main signals when operating as a transmitting apparatus or installation, where the identifier identifies an apparatus or installation to be supervised, a mechanism for transferring the overhead signal as it is when not identified by the identifier, a mechanism for returning a response signal to one of the working transmission line and the protection transmission line from which the overhead signal is received when identified by the identifier, and a mechanism for cutting the apparatus or installation from one of the working transmission line and the protection transmission line so as not to transfer the overhead signal thereto, and passing through the overhead signal in other apparatuses and/or installations.

15 Claims, 10 Drawing Sheets

OPTICAL COMMUNICATION SYSTEM

BACKGROUND OF THE INVENTION

The present invention generally relates to optical communication systems, and more particularly to an optical communication system which transmits an overhead signal together with a main signal in working and protection optical transmission lines.

Figure 1:
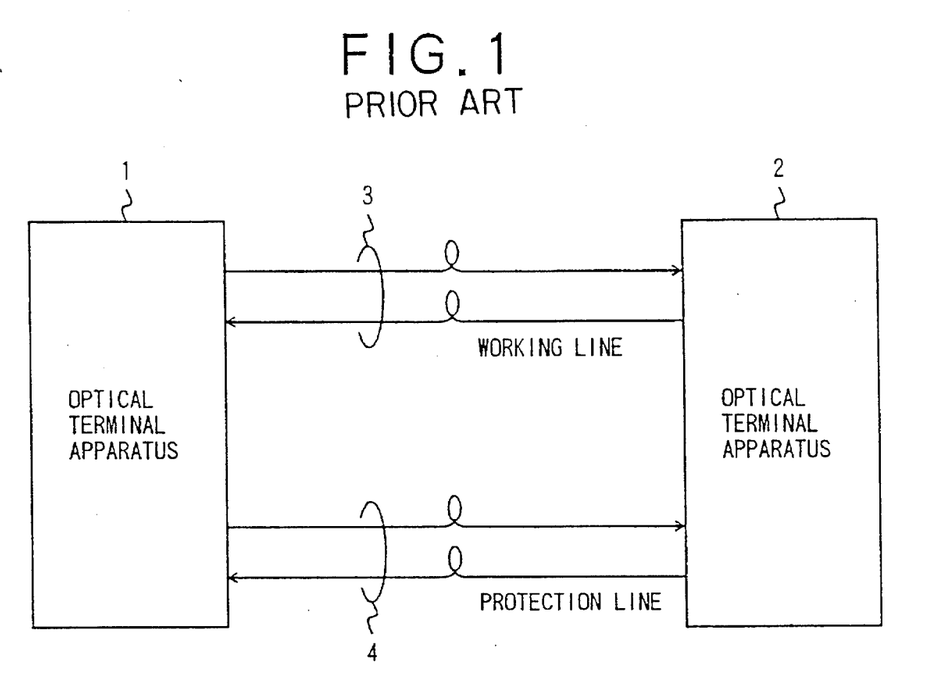
FIG. 1 is a system block diagram showing an example of an optical communication system having optical terminal apparatuses connected by working and protection transmission lines.

Recently, in networks for making large-capacity transmissions using optical fibers, a configuration shown in FIG. 1 is usually employed in order to improve the reliability of the network. More particularly, a working transmission line 3 and a protection transmission line 4 are provided between optical terminal apparatuses 1 and 2.

In order to enable supervision and control of an alarm as well as modifications of various settings when making a communication between the optical terminal apparatuses 1 and 2 shown in FIG. 1, it has become popular to multiplex an overhead signal to a main signal and to make the communication between the optical terminal apparatuses 1 and 2 using high-level data link control (HDLC) procedures or the like.

Figure 2:
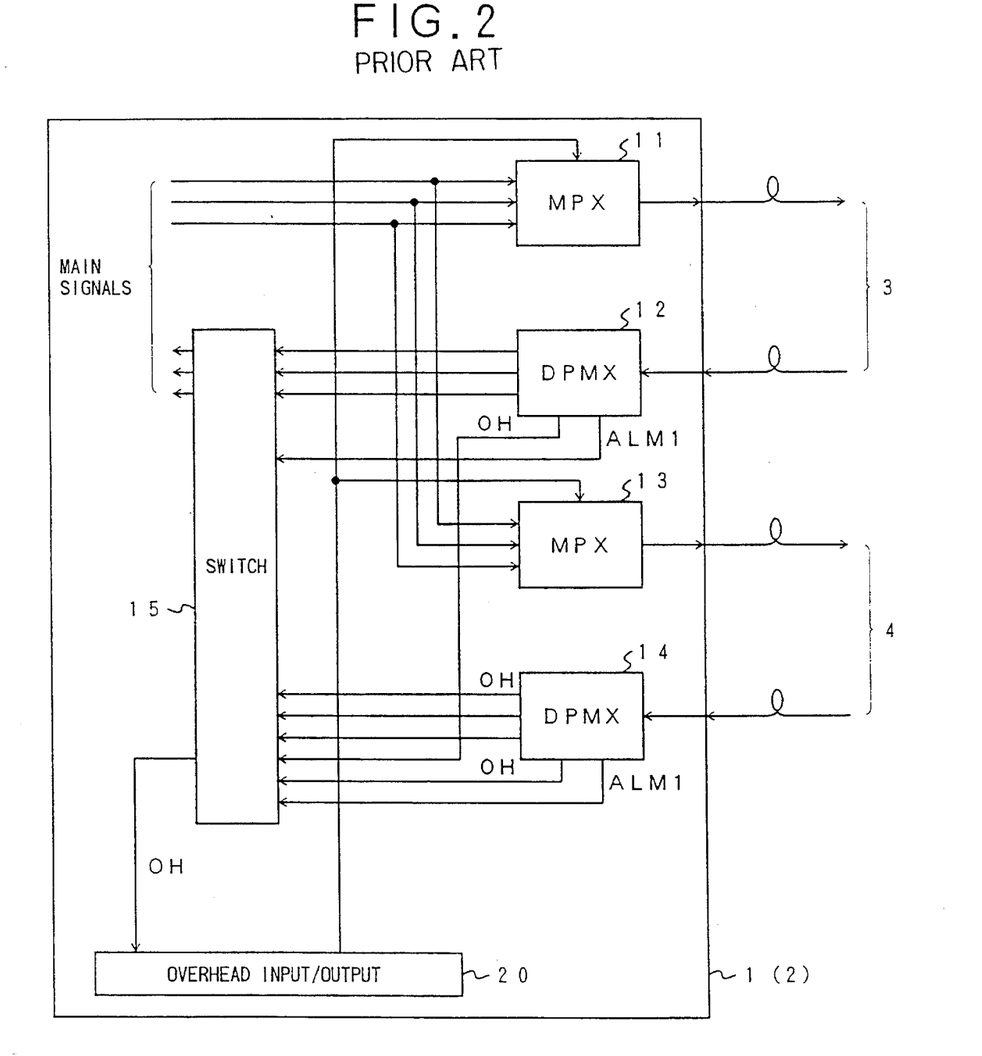
FIG. 2 is a system block diagram showing an example of the construction of the optical terminal apparatus shown in FIG. 1.

FIG. 2 shows an example of the construction of the optical terminal apparatus 1 or 2 shown in FIG. 1. For the sake of convenience, it is assumed that FIG. 2 shows the construction of the optical terminal apparatus 1. The optical terminal apparatus 1 shown in FIG. 2 includes a multiplexer 11, a demultiplexer 12, a multiplexer 13, a demultiplexer 14, a switching circuit 15 and an overhead input/output circuit 20 which are connected as shown.

The multiplexer 11 multiplexes the main signals from a channel part (not shown) of the optical terminal apparatus 1, and transmits a multiplexed signal to the working transmission line 3. On the other hand, the demultiplexer 12 demultiplexes a received signal that is obtained via the working transmission line 3, and supplies demultiplexed signals to the channel part via the switching circuit 15.

The multiplexer 13 receives in parallel the main signals supplied to the multiplexer 11, and multiplexes the main signals. A multiplexed signal is transmitted from the multiplexer 13 to the protection transmission line 4. On the other hand, the demultiplexer 14 demultiplexes a received signal that is obtained via the protection transmission line 4, and supplies demultiplexed signals to the channel part via the switching circuit 15.

The overhead input/output circuit 20 generates an overhead signal OH. This overhead signal OH is supplied in common to the multiplexers 11 and 13, so that the overhead signal OH is multiplexed with the main signals in the multiplexers 11 and 13. The overhead input/output circuit 20 also receives via the switching circuit 15 the overhead signal OH which is separated from the main signals in the demultiplexers 12 and 14.

The switching circuit 15 receives a transmission line supervision alarm signal ALM1 which is separated in the demultiplexers 12 and 14, and carries out a switching so that the main signals which are not in the alarm state are supplied to the channel part and the overhead signal OH is supplied to the overhead input/output circuit 20.

Hence, the main signals and the overhead signal OH are positively transmitted and received via one of the working transmission line 3 and the protection transmission line 4.

Figure 3:
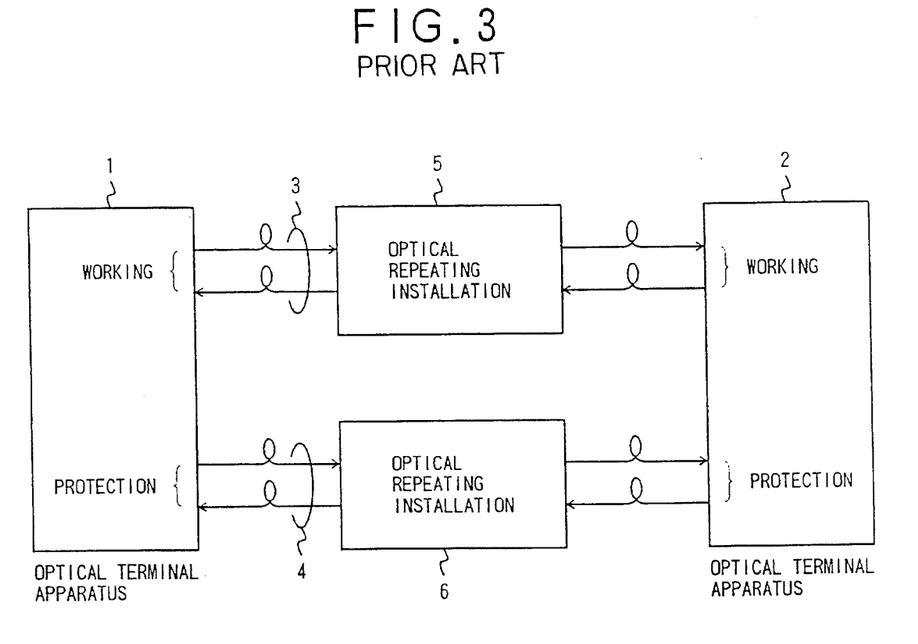
FIG. 3 is a system block diagram showing an example of an optical communication system having optical repeating installations inserted in working and protection transmission lines.

On the other hand, when the working transmission line 3 and the protection transmission line 4 shown in FIG. 1 extend for a long distance, it becomes necessary to provide optical repeating installations 5 and 6 between the optical terminal apparatuses 1 and 2 for the respective working and protection transmission lines 3 and 4, as shown in FIG. 3.

Figure 4:
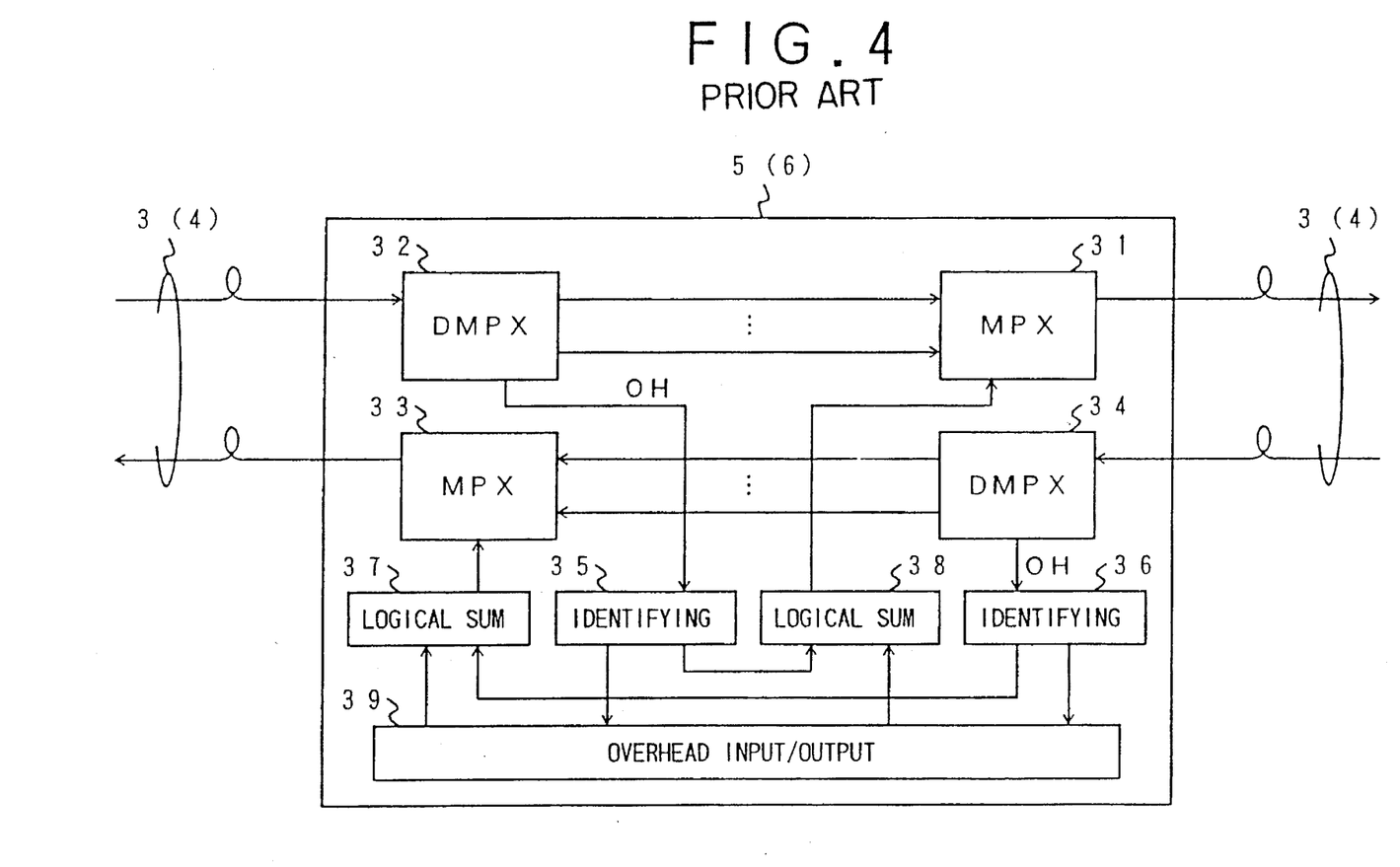
FIG. 4 is a system block diagram showing an example of the construction of the optical repeating installation shown in FIG. 3.

FIG. 4 shows an example of the construction of the optical repeating installation 5 or 6 shown in FIG. 3. For the sake of convenience, it is assumed that FIG. 4 shows the construction of the optical repeating installation 5 which is inserted in the working transmission line 3.

In the optical repeating installation 5 shown in FIG. 4, a demultiplexer 32 and a multiplexer 31 are connected in series in a direction from the optical terminal apparatus 1 to the optical terminal apparatus 2. On the other hand, a demultiplexer 34 and a multiplexer 33 are connected in series in a direction from the optical terminal apparatus 2 to the optical terminal apparatus 1.

Identifier Circuits 35 and 36 decode an identifier (ID) of the apparatus which is the subject of the supervision and is included in the overhead signal OH that is separated from the main signals in the corresponding demultiplexers 32 and 34.

When the identifying circuit 36 judges from the overhead signal OH that the identifier does not identify the apparatus to which this identifying circuit 36 belongs, a logical sum circuit 37 inputs the overhead signal OH and supplies this overhead signal OH to the multiplexer 33. Similarly, when the identifying circuit 35 judges from the overhead signal OH that the identifier does not identify the apparatus to which this identifying circuit 35 belongs, a logical sum circuit 38 inputs the overhead signal OH and supplies this overhead signal OH to the multiplexer 31.

An overhead input/output circuit 39 inputs the overhead signal OH when the identifying circuit 35 judges from the overhead signal OH that the identifier identifies the apparatus to which this identifying circuit 35 belongs. In this case, the overhead input/output circuit 39 supplies a response signal to the logical sum circuit 37 in response to the overhead signal OH from the identifying circuit 35, so that the overhead signal OH is multiplexed with the main signals in the multiplexer 33 and returned to the transmission line 3 from which the overhead signal OH was received.

The overhead input/output circuit 39 also inputs the overhead signal OH when the identifying circuit 36 judges from the overhead signal OH that the identifier identifies the apparatus to which this identifying circuit 36 belongs. In this case, the overhead input/output circuit 39 supplies a response signal to the logical sum circuit 38 in response to the overhead signal OH from the identifying circuit 36, so that the overhead signal OH is multiplexed with the main signals in the multiplexer 31 and returned to the transmission line 3 from which the overhead signal OH was received.

In the optical communication system having the optical repeating installations 5 and 6 inserted in the transmission lines 3 and 4, the overhead signal OH is transmitted from the optical terminal apparatus 1 to the optical terminal apparatus 2 via the optical repeating installation 5 when the switching circuits 15 of the optical terminal apparatuses 1 and 2 select the working transmission line 3, and the overhead signal OH will not be transmitted further. In addition, the overhead signal OH from the optical terminal apparatus 2 is transmitted via the same working transmission line 3 and reaches the optical terminal apparatus 1 via the optical repeating installation 5.

Accordingly, when the communication is being made via the working transmission line 3 as described above, the optical repeating installation 6 in the protection transmission line 4 is cut off from the communication with the optical terminal apparatuses 1 and 2. In other words, the optical repeating installation 6 is disconnected from the network. As a result, the optical repeating installation 6 cannot obtain the overhead signal OH from the optical terminal apparatus 1 or 2, and there was a problem in that the optical repeating installation 6 cannot carry out the supervision of the alarm or the like.

SUMMARY OF THE INVENTION

Accordingly, it is a general object of the present invention to provide a novel and useful optical communication system in which the problem described above is eliminated.

Another and more specific object of the present invention is to provide an optical communication system having optical terminal apparatuses connected by working and protection transmission lines via optical repeating installations, wherein the communication of an overhead signal between the optical terminal apparatuses is ensured regardless of which one of the working and protection transmission lines is being used for the communication, so that a remote supervision or the like is possible.

Still another object of the present invention is to provide an optical communication system comprising first and second optical terminal apparatuses, first and second optical repeating installations, a working transmission line coupling the first and second optical terminal apparatuses via the first optical repeating installation, and a protection transmission line coupling the first and second optical terminal apparatuses via the second optical repeating installation, where each of the first and second optical terminal apparatuses and the first and second optical repeating installations comprise means for transmitting an overhead signal including an identifier to the working transmission line and the protection transmission line by multiplexing the overhead signal with main signals when operating as a transmitting apparatus or installation, where the identifier identifies an apparatus or installation to be supervised, means for transferring the overhead signal as it is when not identified by the identifier, means for returning a response signal to one of the working transmission line and the protection transmission line from which the overhead signal is received when identified by the identifier, and means for cutting the apparatus or installation from one of the working transmission line and the protection transmission line so as not to transfer the overhead signal thereto, and passing through the overhead signal in other apparatuses and/or installations. According to the optical communication system of the present invention, it is possible to obtain the overhead signal in all of the optical terminal apparatuses and the optical repeating installations regardless of which one of the working and protection transmission lines is selected for transmitting the main signals. As a result, it is possible to remotely supervise the apparatuses and installations, thereby making possible to improve the reliability, operation and maintenance of the network.

A further object of the present invention is to provide an optical terminal apparatus adapted to making a communication with another optical terminal apparatus via working and protection transmission lines respectively having optical repeating installations inserted therein, comprising means for transmitting an overhead signal including an identifier to the working transmission line and the protection transmission line by multiplexing the overhead signal with main signals when operating as a transmitting apparatus, where the identifier identifies an apparatus or installation to be supervised, means for transferring the overhead signal as it is when not identified by the identifier, means for returning a response signal to one of the working transmission line and the protection transmission line from which the overhead signal is received when identified by the identifier, and means for cutting the optical terminal apparatus from one of the working transmission line and the protection transmission line so as not to transfer the overhead signal thereto when set to a cut operation state, and for passing the overhead signal when set to a through operation state. According to the optical terminal apparatus of the present invention, it is possible to always obtain the overhead signal in the optical terminal apparatus regardless of which one of the working and protection transmission lines is selected for transmitting the main signals. As a result, it is possible to remotely supervise the apparatuses and installations, thereby making possible to improve the reliability, operation and maintenance of the network.

Another object of the present invention is to provide an optical repeating installation adapted to an optical communication system which makes a communication between two optical terminal apparatuses via working and protection transmission lines respectively having the optical repeating installations inserted therein, comprising means for transmitting an overhead signal including an identifier to the working transmission line and the protection transmission line by multiplexing the overhead signal with main signals when operating as a transmitting apparatus, where the identifier identifies an apparatus or installation to be supervised, means for transferring the overhead signal as it is when not identified by the identifier, means for returning a response signal to one of the working transmission line and the protection transmission line from which the overhead signal is received when identified by the identifier, and means for cutting the optical repeating installation from one of the working transmission line and the protection transmission line so as not to transfer the overhead signal thereto when set to a cut operation state, and for passing the overhead signal when set to a through operation state. According to the optical repeating installation of the present invention, it is possible to always obtain the overhead signal in the optical repeating installation regardless of which one of the working and protection transmission lines is selected for transmitting the main signals. As a result, it is possible to remotely supervise the apparatuses and installations, thereby making possible to improve the reliability, operation and maintenance of the network.

Other objects and further features of the present invention will be apparent from the following detailed description when read in conjunction with the accompanying drawings.

DESCRIPTION OF THE PREFERRED EMBODIMENTS

First, a description will be given of one aspect of the present invention, by referring to FIGS. 5 and 6.

Figure 5:
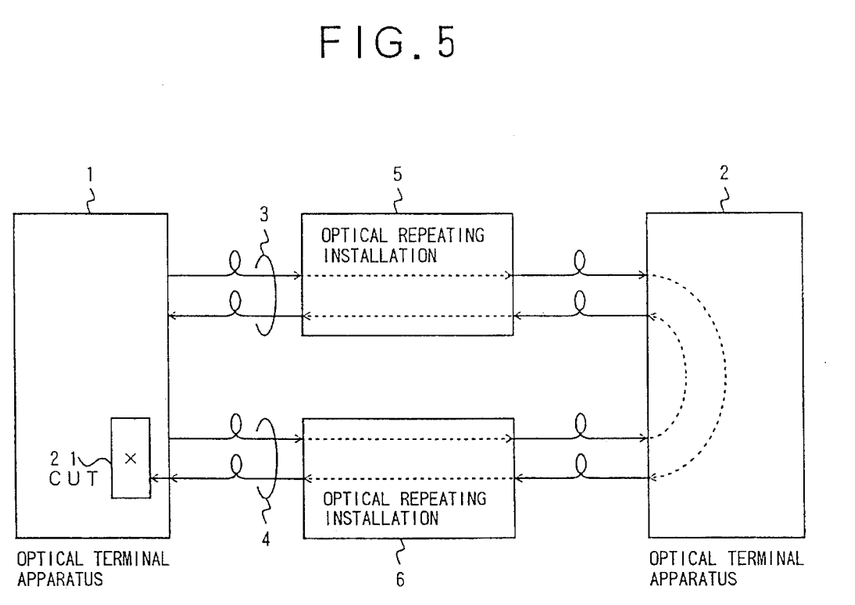
FIG. 5 is a diagram showing a normal flow of an overhead signal in an optical communication system according to the present invention for explaining one aspect of the present invention.

According to one aspect of the present invention, an optical communication system includes optical terminal apparatuses 1 and 2 which are connected by a working transmission line 3 and a protection transmission line 4, and optical repeating installations 5 and 6 inserted in the corresponding working and protection transmission lines 3 and 4, as shown in FIG. 5.

One of the optical terminal apparatuses 1 and 2 and the optical repeating installations 5 and 6 multiplexes an overhead signal including an identifier for identifying the apparatus which is the subject of the supervision with main signals, and transmits, when operating as a transmitting apparatus a multiplexed signal to one of the working and protection transmission lines 3 and 4. Each apparatus or installation not identified by the identifier transfers the overhead signal as it is, and the apparatus or installation identified by the identifier returns a response, using the same transmission line. Each apparatus or installation includes a cut circuit with respect to one of the transmission lines 3 and 4. Only the cut circuit of one of the optical terminal apparatuses 1 and 2 and the optical repeating installations 5 and 6 carries out a cut operation so as not to transfer the overhead signal, while the cut circuit of each remaining apparatus or installation carries out a through operation to transfer the overhead signal as it is.

The cut circuit can be switched manually to carry out the cut operation or the through operation.

FIG. 5 shows the flow of the overhead signal in a normal state of the optical communication system. A cut circuit 21 is provided in each of the optical terminal apparatuses 1 and 2, and a cut circuit 40 (not shown in FIG. 5) is provided in each of the optical repeating installations 5 and 6. Only one of the cut circuits 21 and 40 is set to carry out the cut operation with respect to one of the transmission lines 3 and 4, and the other cut circuits 21 and 40 are set to carry out the through operation.

In the particular case shown in FIG. 5, only the cut circuit 21 of the optical terminal apparatus 1, which is connected to the protection transmission line 4, is set to carry out the cut operation.

The other cut circuits 21 and 40 are set to carry out the through operation as shown in FIG. 5. In other words, the cut circuit 21 of the optical terminal apparatus 2 carries out the through operation so that the signal from the working transmission line 3 is transferred as it is to the protection transmission line 4 and the signal from the protection transmission line 4 is transferred as it is to the working transmission line 3. In addition, the cut circuit 40 of each of the optical repeating installations 5 and 6 carries out the through operation so that the signal from the working transmission line 3 is transferred as it is to the same working transmission line 3 in the same direction, and the signal from the protection transmission line 4 is transferred as it is to the same protection transmission line 4 in the same direction.

Accordingly, two routes are formed in FIG. 5. One route starts from the optical terminal apparatus 1 and reaches the optical repeating installation 6 via the optical repeating installation 5 and the optical terminal apparatus 2. The other route starts from the optical repeating installation 6 and reaches the optical terminal apparatus 1 via the optical terminal apparatus 2 and the optical repeating installation 5. In each of these two routes, one of the optical terminal apparatuses 1 and 2 and the optical repeating installations 5 and 6 becomes the transmitting apparatus and transmits a multiplexed signal by multiplexing the overhead signal with the main signals. When the overhead signal reaches the apparatus or installation which is identified by the identifier included in the overhead signal to identify the subject of the supervision, this overhead signal is dropped at this apparatus or installation.

The apparatus or installation which receives the overhead signal including the identifier identifying this apparatus or installation returns the response using the same transmission line from which the overhead signal is received.

For example, when supervising the optical repeating installation 6 from the optical terminal apparatus 1, the identifier corresponding to the optical repeating installation 6 is inserted into the overhead signal and transmitted from the optical terminal apparatus 1. This overhead signal is transmitted to the optical repeating installation 6 via the optical repeating installation 5 and the optical terminal apparatus 2, and is dropped in the optical repeating installation 6. The response signal from the optical repeating installation 6 is returned using the same transmission line but in the opposite direction. In other words, the response signal is returned from the optical repeating installation 6 to the optical terminal apparatus 1 via the optical terminal apparatus 2 and the optical repeating installation 5.

The cut circuits 21 and 40 are provided in the respective optical terminal apparatuses 1 and 2 and the optical repeating installations 5 and 6, because the identifier included in the overhead signal may be deformed into an identifier which does not exist due to data error or, an erroneous setting of the identifier may occur. Since the network to which the optical communication apparatus according to the present invention is applied normally employs an asynchronous system, the overhead signal including such non-existing or erroneous identifier would continue to flow indefinitely in a loop. Therefore, the cut circuits 21 and 40 are provided to prevent the non-existing or erroneous identifier from flowing in an endless loop.

Figure 6:
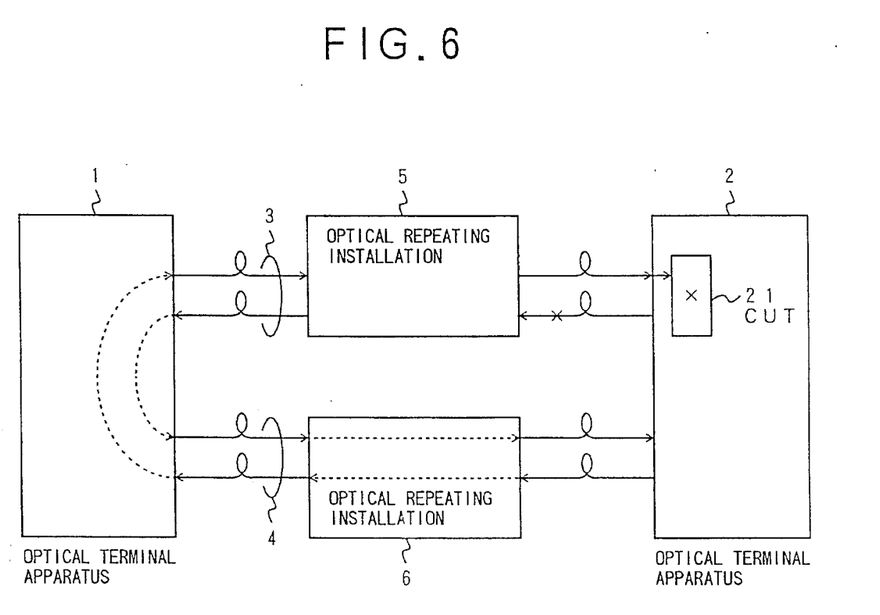
FIG. 6 is a diagram showing a flow of the overhead signal in the optical communication system according to the present invention when a failure occurs for explaining one aspect of the present invention.

On the other hand, a failure may be generated in the working transmission line 3 between the optical terminal apparatus 2 and the optical repeating installation 5, as indicated by "X" in FIG. 6. In this case, the supervising person who supervises this network can no longer supervise the optical repeating installation 6 from the optical terminal apparatus 1 in the state shown in FIG. 5. Hence, the supervising person manually operates the cut circuit 21 in the optical terminal apparatus 2 with respect to the working transmission line 3 to set this cut circuit 21 in the cut operation state, while all of the other cut circuits 21 and 40 are set to the through operation state. In other words, the cut circuit 21 of the optical terminal apparatus 1 is switched to the through operation state, and the cut circuits 40 of the optical repeating installations 5 and 6 remain set to the through operation state.

Accordingly, two routes are formed in this case as shown in FIG. 6. In other words, one route starts from the optical repeating installation 5 and reaches the optical terminal apparatus 2 via the optical terminal apparatus 1 and the optical repeating installation 6. The other route starts from the optical terminal apparatus 2 and reaches the optical repeating installation 5 via the optical repeating installation 6 and the optical terminal apparatus 1. The supervision of the optical repeating installation from the optical terminal apparatus 1 can be made similarly to the above via the protection transmission line 4.

Next, a description will be given of another aspect of the present invention, by referring to FIG. 7.

Figure 7:
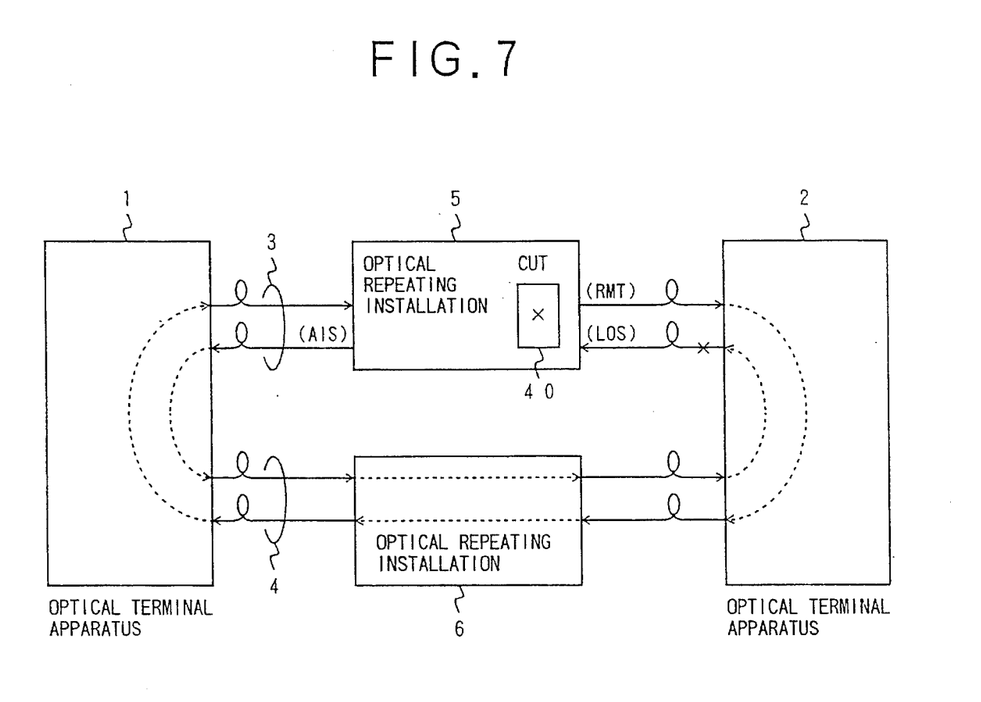
FIG. 7 is a diagram showing a flow of the overhead signal in the optical communication system according to the present invention when a failure occurs for explaining another aspect of the present invention.

According to this other aspect of the present invention, an optical communication system includes optical terminal apparatuses 1 and 2 which are connected by a working transmission line 3 and a protection transmission line 4, and optical repeating installations 5 and 6 inserted in the corresponding working and protection transmission lines 3 and 4, as shown in FIG. 7.

A cut circuit 21 (not shown in FIG. 7) is provided in each of the optical terminal apparatuses 1 and 2 with respect to both a multiplexer and a demultiplexer in the working and protection systems. In addition, a cut circuit 40 is provided in each of the optical repeating installations 5 and 6 with respect to both multiplexers and demultiplexers which are connected to the working and protection transmission lines 3 and 4 on both ends of the respective optical repeating installations 5 and 6. The cut circuits 21 and 40 carry out the cut operation only when a signal cut alarm signal detected by a corresponding demultiplexer is input thereto, and otherwise carry out the through operation.

For example, the cut circuits 21 and 40 carry out the cut operation when a loss of alarm (LOS) alarm signal is received as the signal cut alarm signal, and carry out the through operation when an AIS alarm signal or a remote alarm signal is received.

FIG. 7 shows the flow of the overhead signal in a state where a failure is generated in the optical communication system.

According to the first aspect of the present invention described above, the supervising person manually switches the cut circuit so as to switch between the cut operation and the through operation. However, it may be troublesome and time consuming to make such a manual switching. Hence, in this second aspect of the present invention, the switching of the cut circuit is controlled automatically.

In other words, according to this second aspect of the present invention, the cut circuits 21 and 40 carry out the cut operation in the LOS alarm state where no signal is received and otherwise (AIS and remote (RMT) alarm states) carry out the through operation.

Accordingly, the flow of the overhead signal becomes the same as that shown in FIG. 5 during the normal operation. However, when the failure is generated as in the case shown in FIG. 6, the failure or signal cut is detected by the optical repeating installation 5 and controls the cut circuit 40 of this optical repeating installation 5 to carry out the cut operation.

When the signal cut is detected by the optical repeating installation 5, the AIS alarm or remote (RMT) alarm signal is transmitted to the other transmission line as in the normal case. Hence, the cut circuit 21 or 40 of each apparatus or installation which receives such an alarm signal is controlled to carry out the through operation, and the flow of the overhead signal becomes as shown in FIG. 7. In other words, two routes are formed. One route starts from the optical repeating installation 5 and reaches the optical terminal apparatus 2 via the optical terminal apparatus 1 and the optical repeating installation 6. The other route starts from the optical terminal apparatus 2 and reaches the optical repeating installation 5 via the optical repeating installation 6 and the optical terminal apparatus 1.

Therefore, when supervising the optical repeating installation 6 from the optical terminal apparatus 1 as in the case described above, the overhead signal is transmitted from the optical terminal apparatus 1 to the optical repeating installation 6 via the protection transmission line 4. The optical repeating installation 6 which identifies this overhead signal returns the response signal to the optical terminal apparatus 1 via the protection transmission line 4 in the opposite direction. Thus, it is possible supervise the optical repeating installation 6 from the optical terminal apparatus 1.

As a result, the constant flow of the overhead signal among the apparatuses and installations is ensured regardless of the kind of failure in the transmission line, and the positive supervision operation is made possible.

Figure 8:
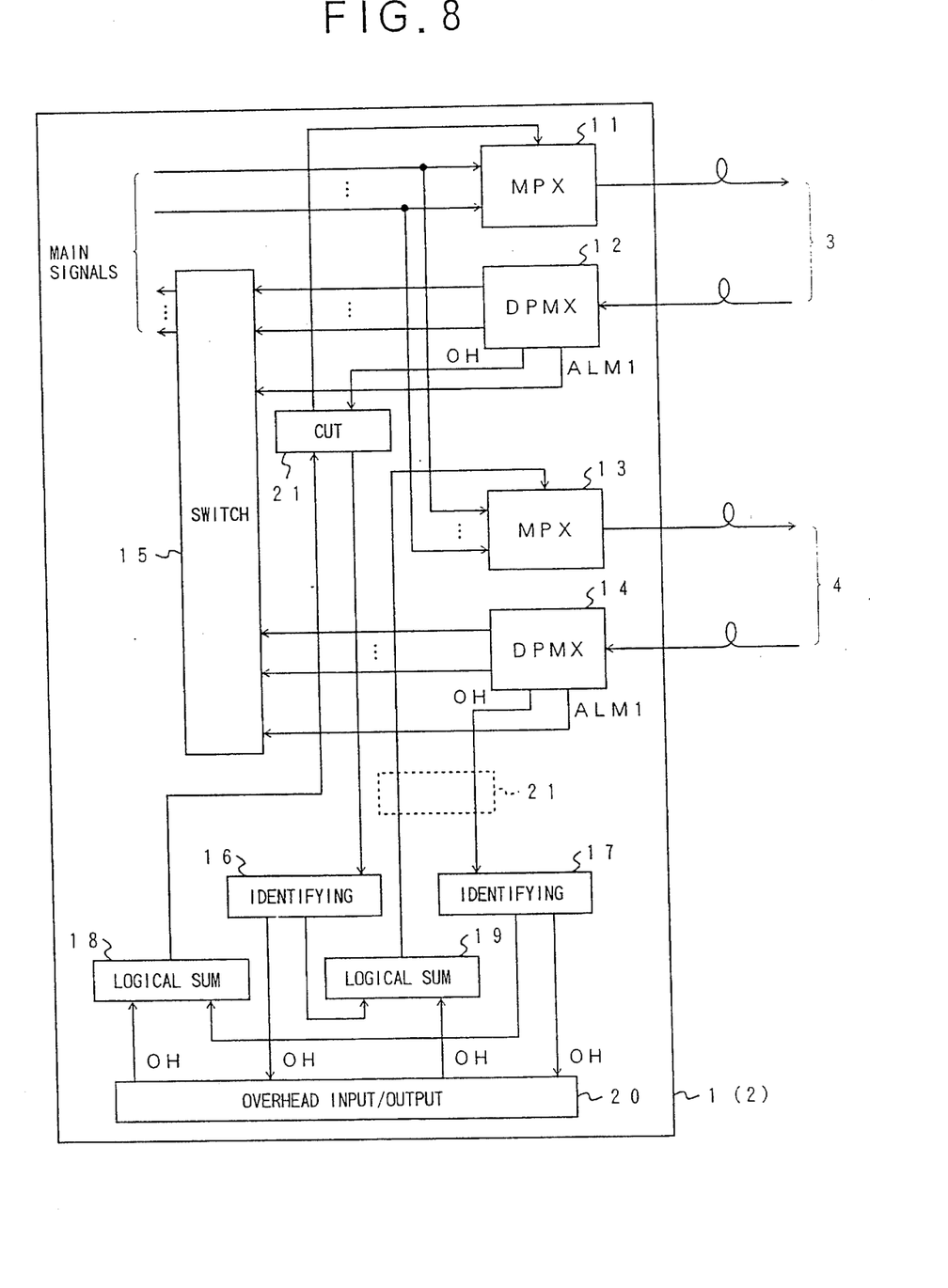
FIG. 8 is a system block diagram showing the construction of an optical terminal apparatus of a first embodiment of the optical communication system according to the present invention.
Figure 9:
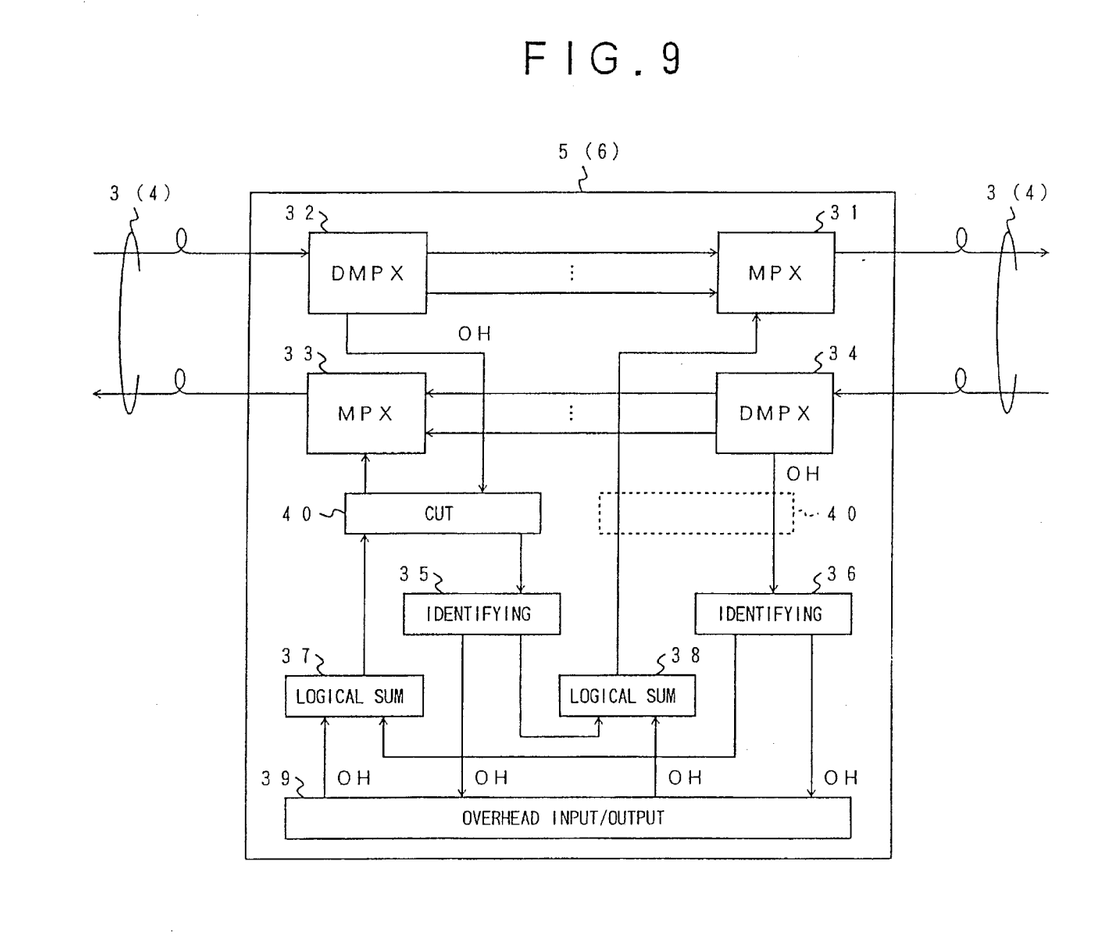
FIG. 9 is a system block diagram showing the construction of an optical repeating installation of the first embodiment of the optical communication system according to the present invention.

Next, a description will be given of a first embodiment of the optical communication system according to the present invention, by referring to FIGS. 8 and 9. FIG. 8 shows an embodiment of an optical terminal apparatus used in this embodiment. In FIG. 8, those parts which are the same as those corresponding parts in FIG. 2 are designated by the same reference numerals. On the other hand, FIG. 9 shows an embodiment of an optical repeating installation used in this embodiment. In FIG. 9, those parts which are the same as those corresponding parts in FIG. 4 are designated by the same reference numerals. The optical terminal apparatus shown in FIG. 8 and the optical repeating installation shown in FIG. 9 are used in the optical communication system shown in FIGS. 5 and 6.

The optical terminal apparatus 1 or 2 shown in FIG. 8 includes multiplexers 11 and 13, demultiplexers 12 and 14, a switching circuit 15, identifying circuits 16 and 17, logical sum circuits 18 and 19, an overhead input/output circuit 20, and a cut circuit 21 which are connected as shown.

The multiplexers 11 and 13 respectively multiplex the overhead signal with the main signals from the optical terminal apparatus 1 (or 2) to which these multiplexers 11 and 13 belong, and transmit multiplexed signals to corresponding working and protection transmission lines 3 and 4. The demultiplexers 12 and 14 respectively demultiplex the main signals and the overhead signal from the multiplexed signals received from the corresponding working and protection transmission lines 3 and 4. The switching circuit 15 selects the main signals separated in the demultiplexer 12 or 14 depending on an alarm signal separated in the demultiplexers 12 and 14. The identifying circuits 16 and 17 respectively decode the identifier within the overhead signals which are separated in the corresponding demultiplexers 12 and 14.

When the identifiers decoded in the identifying circuits 16 and 17 identify an apparatus other than the optical terminal apparatus 1 (or 2) to which these identifying circuits 16 and 17 belong, the logical sum circuits 18 and 19 respectively transfer the overhead signal to the multiplexer 13 of the protection system in the case of the working system, and transfers the overhead signal to the multiplexer 11 of the working system in the case of the protection system.

The overhead input/output circuit 20 inputs the overhead signals from the identifying circuits 16 and 17 when the identifiers decoded in the identifying circuits 16 and 17 identify the optical terminal apparatus 1 (or 2) to which these identifying circuits 16 and 17 belong. In addition to inputting the overhead signals, the overhead input/output circuit 20 outputs a response signal to the logical sum circuits 18 and 19 of the same transmission lines.

The cut circuit 21 cuts only the apparatus set with the overhead signal with respect to the multiplexer and demultiplexer of the working system or the protection system.

On the other hand, the optical repeating installation 5 (or 6) shown in FIG. 9 includes multiplexers 31 and 33, demultiplexers 32 and 34, identifying circuits 35 and 36, logical sum circuits 37 and 38, an overhead input/output circuit 39, and a cut circuit 40 which are connected as shown.

In FIG. 9, the multiplexer 31 multiplexes the overhead signal to the main signal received from the working transmission line 3 (or protection transmission line 4), and the multiplexer 33 multiplexes the overhead signal to the main signal received from the transmission line 3. The multiplexers 31 and 33 hence transmit multiplexed signals to the working transmission line 3 in opposite directions. On the other hand, the demultiplexers 32 and 34 respectively separate the overhead signals from the main signals. The identifying circuits 35 and 36 decode the identifiers in the overhead signals separated in the corresponding demultiplexers 32 and 34.

When the identifiers decoded in the identifying circuits 35 and 36 identify an installation other than the optical repeating installation 5 (or 6) to which these identifying circuits 35 and 36 belong, the logical sum circuits 37 and 38 respectively transfer the overhead signal to the multiplexers 31 and 33 in the same direction.

The overhead input/output circuit 39 inputs the overhead signals from the identifying circuits 35 and 36 when the identifiers decoded in the identifying circuits 35 and 36 identify the optical repeating installation 5 (or 6) to which these identifying circuits 35 and 36 belong. In addition to inputting the overhead signals, the overhead input/output circuit 39 outputs a response signal to the logical sum circuits 37 and 38 for outputting the response signal in the same direction as the received overhead signal.

The cut circuit 40 cuts only the installation set with the overhead signal with respect to the multiplexer and demultiplexer connected to one side of the working transmission line 3 (or protection transmission line 4).

Instead of providing the cut circuit 40 at the position indicated by the solid line in FIG. 9, it is possible to provide the cut circuit 40 at the position indicated by the dotted line in FIG. 9.

Next, a description will be given of the operations of the optical terminal apparatus shown in FIG. 8 and the optical repeating installation shown in FIG. 9 when applied to the configuration shown in FIGS. 5 and 6.

In the embodiment show in FIG. 8, the cut circuit 21 is provided with respect to the working transmission line 3. However, it is possible to provide the cut circuit 21 with respect to the protection transmission line 4 as indicated by the dotted line in FIG. 8. In the system shown in FIG. 5 described above, this cut circuit 21 is provided with respect to the protection transmission line 4, and thus, the cut circuit 21 indicated by the solid line in FIG. 5 is not shown in FIG. 8.

The optical terminal apparatus 1 supervises the optical repeating installation 6 similarly to the above described case. Hence, the overhead signal OH which includes the identifier of the optical repeating installation 6 is supplied from the overhead input/output circuit 20 to the multiplexer 11 via the logical sum circuit 18. The multiplexer 11 multiplexes the main signals and the overhead signal OH and supplies the multiplexed signal to the optical repeating installation 5 in the next stage via the working transmission line 3. As shown in FIG. 9, the demultiplexer 32 of the optical repeating installation 5 demultiplexes the overhead signal OH from the main signals and supplies the overhead signal OH to the cut circuit 40.

In the case shown in FIG. 5, only the cut circuit 21 of the optical terminal apparatus 1 shown in FIG. 8 is in the cut operation state, and the cut circuit 40 of the optical repeating installation 5 shown in FIG. 9 is in the through operation state.

Accordingly, the overhead signal OH which is separated by the demultiplexing in the demultiplexer 32 is supplied to the identifying circuit 35, and the identifying circuit 35 judges whether or not this identifier matches the identifier of the optical repeating installation 5. Since the two identifiers do not match in this case, the overhead signal OH is supplied to the multiplexer 31 via the logical sum circuit 38 and is multiplexed with the main signals from the demultiplexer 32. The multiplexed signal from the multiplexer 31 is again transmitted to the working transmission line 3.

Since the overhead signal OH is supplied to the demultiplexer 12 of the optical terminal apparatus 2 in this manner, the overhead signal OH which is separated by the demultiplexing in the demultiplexer 12 is supplied to the identifying circuit 16. The identifying circuit 16 judges whether or not this identifier matches the identifier of the optical terminal apparatus 1. In this case, the two identifiers do not match, and thus, the overhead signal OH is supplied to the multiplexer 13 via the logical sum circuit 19. The multiplexer 13 multiplexes the overhead signal OH with the main signals, and supplies the multiplexed signal to the protection transmission line 4.

The overhead signal OH transmitted to the protection transmission line 4 is supplied to the demultiplexer 34 of the optical repeating installation 6. Hence, the demultiplexer 34 demultiplexes the overhead signal OH from the main signals, and supplies the separated overhead signal OH to the identifying circuit 36. This identifying circuit of the optical repeating installation 6 judges whether or not this identifier within the overhead signal OH matches the identifier of the optical repeating installation 6. In this case, the two identifiers match. Hence, this overhead signal OH is supplied to the overhead input/output circuit 39. The overhead input/output circuit 39 generates the response signal and supplies this response signal to the multiplexer 31 via the logical sum circuit 38. The multiplexer 31 multiplexes the response signal with the main signals, and transmits the multiplexed signal to the optical terminal apparatus 2 via the protection transmission line 2.

In other words, when the overhead signal OH is detected in the apparatus or installation which is the subject of the supervision, the overhead signal is returned so as to go back via the same transmission line. In the particular case described above, a returning path is formed in a reverse direction to the going path, that is, from the optical repeating installation 6 to the optical terminal apparatus 1 via the optical terminal apparatus 2 and the optical repeating installation 5. Hence, the overhead signal OH is supplied to the demultiplexer 12 of the optical terminal apparatus 1 in the form of the multiplexed signal including the main signals.

Therefore, in the optical terminal apparatus 1, the overhead signal OH separated in the demultiplexer 12 is supplied to the identifying circuit 16. In this case, the identifier within this overhead signal OH output from the optical repeating installation 6 matches the identifier of the optical terminal apparatus 1. Hence, this overhead signal OH is supplied to the overhead input/output circuit 20, thereby completing the supervision operation.

Figure 10:
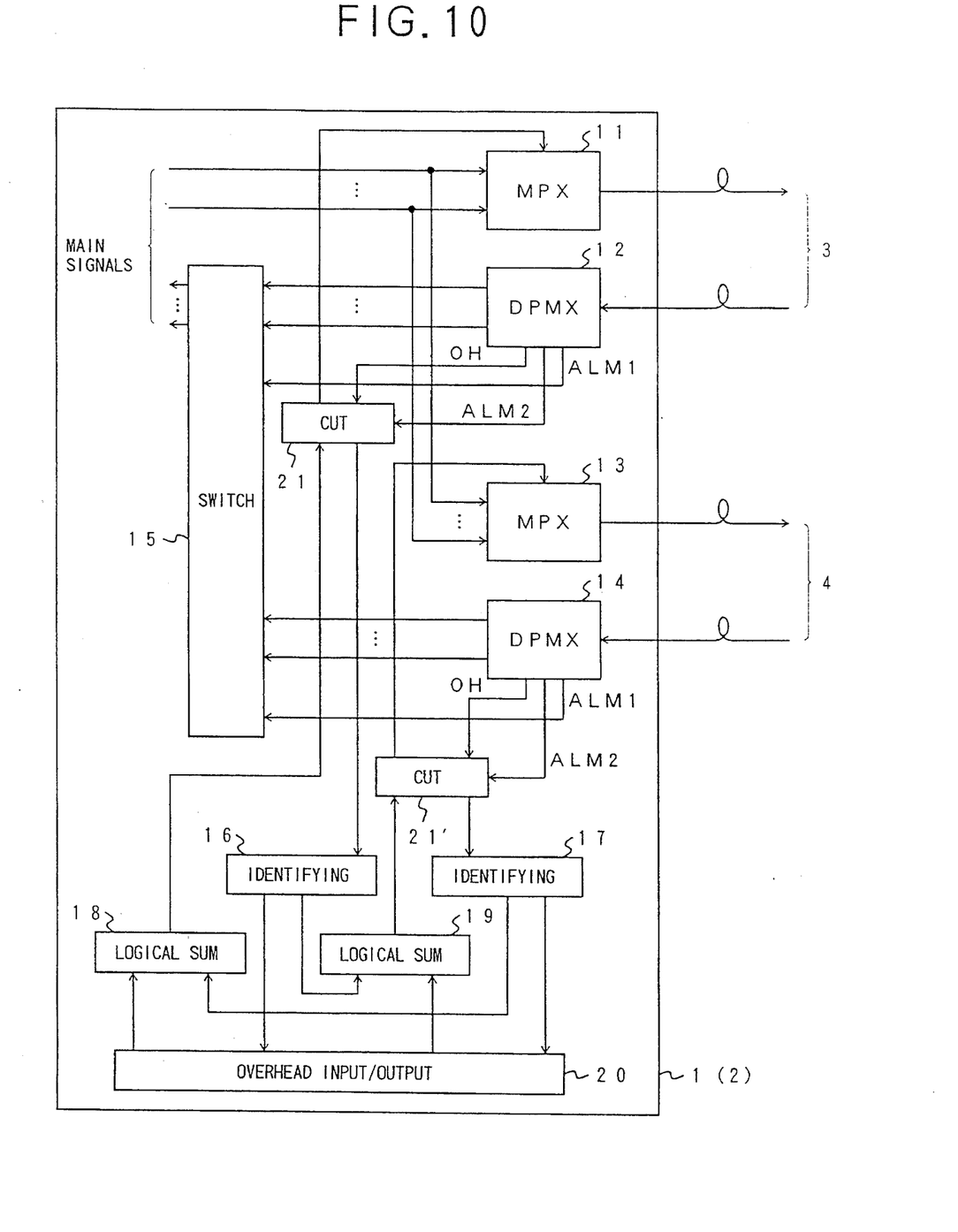
FIG. 10 is a system block diagram showing the construction of an optical terminal apparatus of a second embodiment of the optical communication system according to the present invention.
Figure 11:
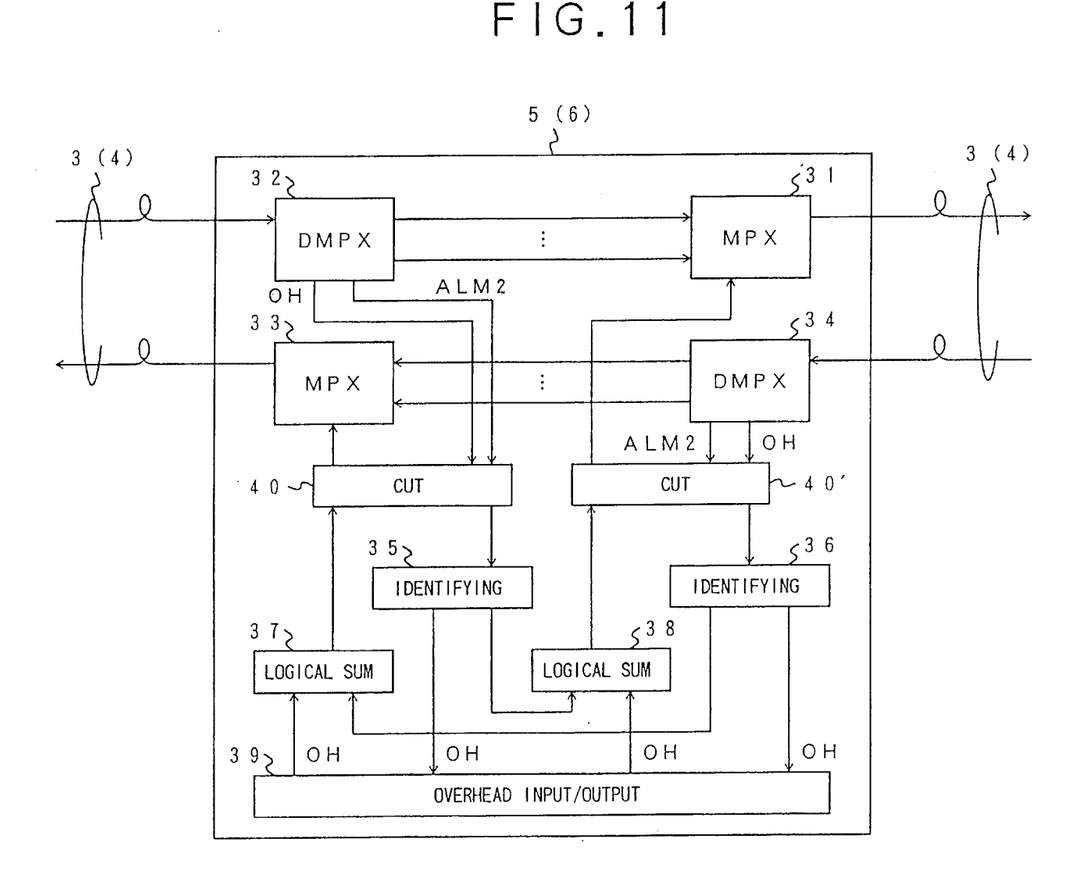
FIG. 11 is a system block diagram showing the construction of an optical repeating installation of the second embodiment of the optical communication system according to the present invention.

Next, a description will be given of a second embodiment of the optical communication system according to the present invention, by referring to FIGS. 10 and 11. FIG. 10 shows an embodiment of the optical terminal apparatus of the second embodiment, and FIG. 11 shows an embodiment of the optical repeating installation of the second embodiment. In FIGS. 10 and 11, those parts which are the same as those corresponding parts in FIGS. 9 and 10 are designated by the same reference numerals, and a description thereof will be omitted.

The embodiment of the optical terminal apparatus shown in FIG. 10 differs from that shown in FIG. 8 in that a cut circuit 21 is provided with respect to the working transmission line 3 and a cut circuit 21' is provided with respect to the protection transmission line 4. In addition, an alarm signal ALM2 which is separated in the demultiplexers 12 and 14 is supplied to the cut circuits 21 and 21' to control these cut circuits 21 and 21'. This alarm signal ALM2 is different from the alarm signal ALM1 with respect to the main signals.

On the other hand, the embodiment of the optical repeating installation shown in FIG. 11 differs from that shown in FIG. 9 in that two cut circuits 40 and 40' are provided. In addition, an alarm signal ALM2 separated in the demultiplexers 32 and 34 is supplied to these cut circuits 40 and 40' to automatically switch the cut operation and the through operation of the cut circuits 40 and 40'.

Next, a description will be given of the operation of this second embodiment when the optical terminal apparatus and the optical repeating installation shown in FIGS. 10 and 11 are applied to the system shown in FIG. 7.

First, when a failure is generated on the working transmission line 3 between the optical terminal apparatus 2 and the optical repeating installation 5 shown in FIG. 7, the demultiplexer 34 of the optical repeating installation 5 separates the loss of alarm (LOS) signal ALM2 which indicates the signal cut state. In addition, the demultiplexer 34 supplies the alarm signal ALM2 to the cut circuit 40'. The cut circuit 40' is controlled to the cut operation state in response to this alarm signal ALM2. As a result, the multiplexer 31 and the demultiplexer 34 are disconnected from the logical sum circuit 38 and the identifying circuit 36. On the other hand, in the LOS alarm state, the demultiplexer 34 supplies the AIS alarm signal to the multiplexer 33 by including the AIS alarm signal within the main signals. Hence, the AIS alarm signal is supplied to the next optical terminal apparatus 1 via the multiplexer In the optical terminal apparatus 1, the demultiplexer 12 which is connected to the working transmission line 3 detects the above AIS alarm signal. In this state, unlike the LOS alarm signal described above, the AIS alarm signal sets the cut circuit 21 to the through operation.

In addition, since the cut circuit 40' of the optical repeating installation 5 carries out the cut operation as described above, no overhead signal OH is input to the multiplexer 31. Hence, no overhead signal OH or, the overhead signal OH including the remote (RMT) alarm signal, is transmitted to the optical terminal apparatus 2 via the working transmission line 3.

Accordingly, in the optical terminal apparatus 2, no LOS alarm is output from the demultiplexer 12, and thus, the cut circuit 21 is set to the through operation. Furthermore, the overhead signal OH separated by the demultiplexer 12 is supplied to the identifying circuit 16 via the cut circuit 21. But because the two identifiers do not match in this case, the overhead signal OH is supplied to the cut circuit 21' via the logical sum circuit 19. This cut circuit 21' is also set to the through operation. Hence, the overhead signal OH passes through the cut circuit 21' and is transmitted to the protection transmission line 4 via the multiplexer 13 which multiplexes the overhead signal OH with the main signals.

Similarly, the cut circuits 40 and 40' within the optical repeating installation 6 and the optical terminal apparatus 1 are set to the through operation.

Hence, when supervising the optical repeating installation 6 from the optical terminal apparatus 1 in the above described state, the overhead signal OH including the identifier of the optical repeating installation 6 is generated from the overhead input/output circuit 20 of the optical terminal apparatus 1. This overhead signal OH is supplied to the optical repeating installation 6 via the logical sum circuit 19, the cut circuit 21' and the multiplexer 13. The demultiplexer 32 of the optical repeating installation 6 separates this overhead signal OH and supplies this overhead signal OH to the identifying circuit 35 via the cut circuit 40. In this case, the two identifiers match in the identifying circuit 35. Hence, the overhead signal OH is input to the overhead input/output circuit 39.

In response to the overhead signal OH, the overhead input/output circuit 39 supplies the overhead signal OH corresponding to the response signal to the cut circuit 40 via the logical sum circuit 37. This overhead signal OH passes through the cut circuit 40 which is in the through operation state, and is transmitted to the optical terminal apparatus 1 via the multiplexer 33. At the optical terminal apparatus 1, the demultiplexer 14 separates the overhead signal OH, and supplies this overhead signal OH to the identifying circuit 17 via the cut circuit 21' which is in the through operation state.

At the identifying circuit 17 of the optical terminal apparatus 1, the identifier included in the overhead signal OH from the optical repeating installation 6 matches the identifier of the optical terminal apparatus 1. Therefore, the supervising operation is completed by supplying this overhead signal OH to the overhead input/output circuit 20 from the identifying circuit 17.

Further, the present invention is not limited to these embodiments, but various variations and modifications may be made without departing from the scope of the present invention.

What is claimed is:

1. An optical communication system comprising:

first and second optical terminal apparatuses;

first and second optical repeating installations;

a working transmission line coupling said first and second optical terminal apparatuses via said first optical repeating installation; and a protection transmission line coupling said first and second optical terminal apparatuses via said second optical repeating installation, each of said first and second optical terminal apparatuses and said first and second optical repeating installations comprising:

means for transmitting an overhead signal including an identifier for identifying an apparatus or installation to be supervised with main signals, to said working transmission line and said protection transmission line by multiplexing the overhead signal with main signals when a respective one of said first and second optical terminal apparatuses and said first and second repeating installation operates as a transmitting apparatus or installation;

means for transferring the overhead signal as it is to one of said working transmission line and said protection transmission line via said means for transmitting an overhead signal when the apparatus or installation to be supervised is not identified by the identifier;

means for returning a response signal to the respective apparatus or installation operating as a transmitting apparatus or installation via one of said working transmission line and said protection transmission line, from which the overhead signal has been received, when the apparatus or installation to be supervised is identified by the identifier; and means for cutting the respective apparatus or installation from one of said working transmission line and said protection transmission line so as not to transfer the overhead signal thereto, and passing through the overhead signal in other of said apparatuses and installations.

2. The optical communication system as claimed in claim 1, wherein each of said first and second optical terminal apparatuses comprises:

multiplexer means, provided with respect to working and protection systems, for multiplexing the main signals originating from the optical terminal apparatus to which said multiplexer means belongs, with the overhead signal and transmitting a multiplexed signal to said working transmission line and said protection transmission line;

demultiplexer means, provided with respect to the working and protection systems, for demultiplexing and separating the main signals and the overhead signal received from said working transmission line and said protection transmission line;

switching means for switching the main signals separated in said demultiplexer means depending on an alarm signal also separated in said demultiplexer means;

identifying means for decoding the identifier within the overhead signal separated in said demultiplexer means;

logical sum means, provided with respect to the working and protection system, for transferring the overhead signal received via said working transmission line to the protection system of said multiplexer means and transferring the overhead signal received via said protection transmission line to the working system of said multiplexer means when the identifier decoded in said identifying means identifies the optical terminal apparatus to which said logical sum means belongs;

overhead input/output means for inputting the overhead signal from said identifying means when the identifier decoded in said identifying means identifies the optical terminal apparatus to which said overhead input/output means belongs, and for outputting a response signal to the working or protection system of said logical sum means corresponding to one of said working transmission line and said protection transmission line, from which the overhead signal is received; and cut means for cutting the overhead signal with respect to the working or protection system of said multiplexer means and said demultiplexer means when set to a cut operation state.

3. The optical communication system as claimed in claim 2, wherein said cut means is switched between the cut operation state and a through operation state by a manual operation.

4. The optical communication system as claimed in claim 2, wherein said cut means is provided with respect to both the working and protection systems of said mutiplexer means and said demultiplexer means.

5. The optical communication system as claimed in claim 4, wherein said cut means is switched between the cut operation state and a through operation state, and said cut means is automatially set to the cut operation state in response to a loss of alarm (LOS) alarm signal which is received as a signal cut alarm signal and set to the through operation state in response to an AIS alarm signal or a remote alarm signal.

6. The optical communication system as claimed in claim 1, wherein each of said first and second optical repeating installations comprises:

multiplexer means for multiplexing the main signals received from both directions of one of said working transmission line and said protection transmission line in which the optical repeating installation is inserted, with the overhead signal and transmitting a multiplexed signal to said one of said working transmission line and said protection transmission line in which the optical repeating installation is inserted;

demultiplexer means for demultiplexing and separating the main signals and the overhead signal received from both directions of one of said working transmission line and said protection transmission line in which the optical repeating installation is inserted;

identifying means for decoding the identifier within the overhead signal separated in said demultiplexer means;

logical sum means, provided with respect to both directions of one of said working transmission line and said protection transmission line in which the optical repeating installation is inserted, for transferring the overhead signal received from one direction to said multiplexer means in said one direction when the identifier decoded in said identifying means identifies an optical repeating installation other than the optical repeating installation to which said logical sum means belongs;

overhead input/output means for inputting the overhead signal from said identifying means when the identifier decoded in said identifying means identifies the optical repeating installation to which said overhead input/output means belongs, and for outputting a response signal in the same direction from which the overhead signal is received; and cut means for cutting the overhead signal with respect to said multiplexer means and said demultiplexer means coupled to one side of said one of said working transmission line and said protection transmission line in which the optical repeating installation is inserted when set to a cut operation state.

7. The optical communication system as claimed in claim 6, wherein said cut means is switched between the cut operation state and a through operation state by a manual operation.

8. The optical communication system as claimed in claim 6, wherein said cut means is provided with respect to said multiplexer means and said demultiplexer means provided with respect to both directions of the working transmission line and the protection transmission line.

9. The optical communication system as claimed in claim 8, wherein said cut means is switched between the cut operation state and a through operation state, and said cut means is automatically set to the cut operation state in response to a loss of alarm (LOS) alarm signal which is received as a signal cut alarm signal and set to the through operation state in response to an AIS alarm signal or a remote alarm signal.

10. An optical terminal apparatus adapted for making a communication with another optical terminal apparatus via a working transmission line and a protection transmission line, respectively having optical repeating installations inserted therein, said optical terminal apparatus comprising:

means for transmitting an overhead signal including an identifier for identifying an optical terminal apparatus or an optical repeating installation to be supervised with main signals, to the working transmission line and the protection transmission line by multiplexing the overhead signal with the main signals when the optical terminal apparatus is operating as a transmitting apparatus;

means for transferring the overhead signal as it is to one of said working transmission line and said protection transmission line via said transmitting means when the apparatus or installation to be supervised is not identified by the identifier;

means for returning a response signal to the optical terminal apparatus via one of the working transmission line and the protection transmission line, from which the overhead signal has been received, when the apparatus or installation to be supervised is identified by the identifier; and means for cutting the optical terminal apparatus from one of the working transmission line and the protection transmission line so as not to transfer the overhead signal thereto when set to a cut operation state, and for passing the overhead signal when set to a through operation state.

11. The optical terminal apparatus as claimed in claim 10, wherein said cut means is switched between the cut operation state and the through operation state by a manual operation.

12. The optical terminal apparatus as claimed in claim 10, wherein said cut means is automatically set to the cut operation state in response to a loss of alarm (LOS) alarm signal which is received as a signal cut alarm signal and set to the through operation state in response to an AIS alarm signal or a remote alarm signal.

13. An optical repeating installation adapted for an optical communication system which makes a communication between two optical terminal apparatuses via a working transmission line and a protection transmission line each having the optical repeating installation inserted therein, said optical repeating installation comprising:

means for transmitting an overhead signal including an identifier for identifying an optical terminal apparatus or an optical repeating installation to be supervised with main signals to the working transmission line and the protection transmission line by multiplexing the overhead signal with the main signals when the optical repeating installation operates as a transmitting apparatus;

means for transferring the overhead signal as it is to one of said working transmission line and said protection transmission line via said transmitting means when the apparatus or installation to be supervised is not identified by the identifier;

means for returning a response signal to the optical repeating installation via one of the working transmission line and the protection transmission line, from which the overhead signal is received, when the apparatus or installation to be supervised is identified by the identifier; and means for cutting the optical repeating installation from one of the working transmission line and the protection transmission line so as not to transfer the overhead signal thereto when set to a cut operation state, and for passing the overhead signal when set to a through operation state.

14. The optical repeating installation as claimed in claim 13, wherein said cut means is switched between the cut operation state and the through operation state by a manual operation.

15. The optical repeating installation as claimed in claim 13, wherein said cut means is automatically set to the cut operation state in response to a loss of alarm (LOS) alarm signal which is received as a signal cut alarm signal and set to the through operation state in response to an AIS alarm signal or a remote alarm signal.

* * * * *